Figure 1A:
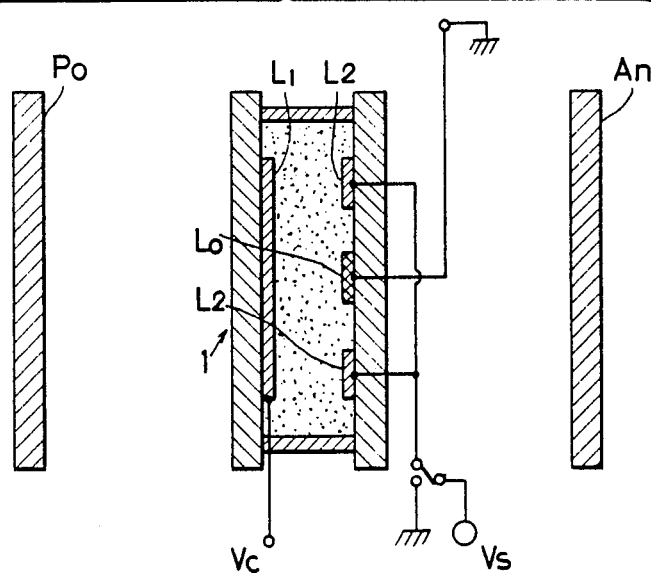

United States Patent [19]

Kawamura et al.

[11] Patent Number: 4,645,304
[45] Date of Patent: Feb. 24, 1987

[54] LIQUID CRYSTAL DEVICE HAVING INTERDIGITATED ELECTRODES WITH SHADE MEMBER

[75] Inventors: Takao Kawamura; Akihiko Sugimura, both of Sakai, Japan

[73] Assignees: Kyocera Corporation, Kyoto; Takao Kawamura, Sakai, both of Japan

[21] Appl. No.: 409,848

[22] Filed: Aug. 20, 1982

[30] Foreign Application Priority Data

| Aug. 25, 1981 | [JP] | Japan | 56-133674 |
| Sep. 7, 1981 | [JP] | Japan | 56-141482 |
| Sep. 18, 1981 | [JP] | Japan | 56-148394 |
| Oct. 15, 1981 | [JP] | Japan | 56-165376 |

[51] Int. Cl.⁴ ............................................. G02F 1/13
[52] U.S. Cl. ..................... 350/336; 350/339 R; 350/347 E; 350/347 V
[58] Field of Search .............. 350/336, 339 R, 347 V, 350/347 E, 346, 349

[56] References Cited

U.S. PATENT DOCUMENTS

| 3,960,751 | 6/1976 | Moriyama et al. | 350/349 X |
| 3,981,559 | 9/1976 | Channin | 350/336 |
| 4,385,805 | 5/1983 | Channin | 350/336 X |

FOREIGN PATENT DOCUMENTS

| 0995783 | 8/1976 | Canada | 350/336 |
| 54-153598 | 12/1979 | Japan | 350/336 |

OTHER PUBLICATIONS

Denisov, Y. V. et al., "Investigation of Ordering of the Mesophase of Cholesteric Liquid Crystals...," *Soviet Physics JETP*, vol. 44, No. 2, (Aug. 1976), pp. 357–363.
Graf, *Modern Dictionary of Electronics* (6th ed. 1984), pp. 254–255.
Boyd, G. D., et al., "Liquid-Crystal Orientational Bistability and Nematic Storage Effects", *Applied Physics Lett.*, vol. 36, No. 7, pp. 556–558, (Apr. 1980).
De Gennes, P. G., *The Physics of Liquid Crystals*, pp. ix–xi & 345–347 (Clarendon Press, Oxford 1975).
Soref, R. A. "Field Effects in Nematic Liquid Crystals Obtained with Interdigital Electrodes," *J. of Applied Physics*, vol. 45, No. 12, (Dec. 1974), pp. 5466–5468.

*Primary Examiner*—John K. Corbin
*Assistant Examiner*—Richard F. Gallivan
*Attorney, Agent, or Firm*—Spensley Horn Jubas & Lubitz

[57] ABSTRACT

This invention relates to a liquid crystal device applying an optoelectronic effect of liquid crystal.

This invention aims at the provision of a liquid crystal device comprising; a liquid crystal cell which has a transparent substrate having interdigital electrodes and a transparent substrate having an opposite electrode, the transparent substrates being disposed close to each other so as to allow both the electrodes to be opposite to each other, and which charges liquid crystal between both the transparent substrates; and a polarizer having polarization axis extending in parallel to the orientation of the liquid crystal caused by the electric field between the interdigital electrodes; thereby responding at high speed, having a high contrast ratio in ON and OFF conditions of the transmission light, and being small-sized and inexpensive to produce.

8 Claims, 5 Drawing Figures

LIQUID CRYSTAL DEVICE HAVING INTERDIGITATED ELECTRODES WITH SHADE MEMBER

This invention relates to a liquid crystal device utilizing an optoelectronic effect of liquid crystal, and more particularly to a liquid crystal device utilizing the dichroism possessed by liquid crystal molecules, in other words, the characteristic that the absorption index of the light is different in the direction of the major axis and that perpendicular thereto at the liquid crystal molecules.

Recently, the liquid crystal device applies the optoelectronic effect exhibited by the liquid crystal and is widely used as display devices for numeral display panels of wrist watches or electric calculators, and also the application of the liquid crystal device is expected to be developed in the field of optoelectronics, such as optoelectronic shutters used in cameras or optoelectronic scanners for printers, other than the display device.

In a case that the optoelectronic effect of conventional liquid crystal device is used to actuate, for example, the optoelectronic shutter, however, the orientations of liquid crystal in two directions in order to form the ON or OFF condition for the transmission light are so different that one orientation is to apply the electric field between the opposite electrodes so as to forcibly change the alignment of liquid crystal molecules existing between both the electrodes, while, the other depends only upon molecule orientation based on the initial alignment of liquid crystal molecules, whereby the response speed of liquid crystal is extremely slow as several tens to several hundreds msec and the light is not completely intercepted. Hence, it has been absolutely impossible to put such conventional liquid crystal device to practical use as the optoelectronic shutter.

Furthermore, the conventional liquid crystal, when used for a display device of the display unit, has been defective in that the slow response speed makes it impossible to obtain a quick display.

Accordingly, a liquid crystal device has been proposed by Channin, which is of three electrode construction such that one of opposite electrodes at the cell is interdigital to thereby eliminate the defect in the response speed at the conventional liquid crystal device.

Figure 1B:
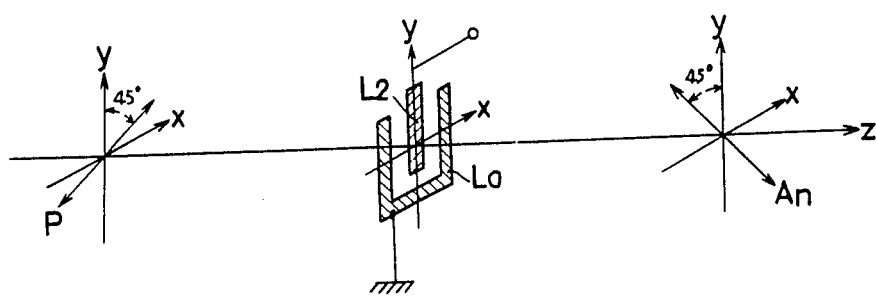

Such liquid crystal device using the cell of three electrodes utilizes retardation from the optical anisotropy of liquid crystal molecules and is so constructed that a liquid crystal cell, as shown in FIGS. 1-(A) and -(B), is disposed between two polarizers Po and An whose polarization axes intercross at a right angle to each other so that the lengthwise direction (the direction of axis y) of interdigital electrodes $L_0$ and $L_2$ at the liquid cell 1 is inclined at an angle of 45° with respect to the polarization axes of both the polarizers Po and An. The liquid crystal molecules, when voltage Vc is applied between the opposite electrodes $L_0$ and $L_1$ at the liquid crystal cell 1, the liquid crystal molecules vertically orient (in the direction of the axis Z in FIG. 1-(B)) so that the light passes through the liquid cell as it is and completely intercepted by the two polarizers Po and An perpendicular to each other, thereby being in condition of OFF for the light. While, when voltage Vc is applied between the interdigital electrodes $L_0$ and $L_2$, the liquid crystal molecules orient in parallel (in the direction of the axis x in FIG. 1-(B)) and have the characteristic as the same as uniaxial crystal having the optical axis in the direction of the axis x, so that the optical axis inclines at an angle of 45° to the two polarizers thereby allowing the light to pass therethrough in the intensity given by the following equation, thus being in condition of ON for the light:

$$I = I_0 \sin^2 2\phi \sin^2 (\delta/2)$$

where $I_0$: the intensity of the light after deducting a loss during the pass of the light through the polarizers Po and An.

$\phi$: an angle between the polarizing direction of the incident light and the axis of liquid molecule, as $\phi = 45°$, and $\delta$: a phase difference between the ordinary ray and the extraordinary ray in the liquid crystal cell.

Thus, the ON or OFF condition of the light is controlled by switching voltages Vc and Vd to be applied. The liquid crystal device using the cell of three electrode construction, whose liquid crystal orientations all are forced to form the ON or OFF condition of the transmission light, can obtain the high response speed such as several msec.

The liquid crystal device using such Channin's liquid crystal cell of three electrode construction, however, inevitably requires two polarizers to form ON or OFF condition for the transmission light, the two polarizers bringing a loss on the light passing the same so that the light is extremely weakened to lower the contrast ratio in the ON and OFF conditions of the transmission light. At the same time, the requirement of the expensive polarizers will make the liquid crystal device large-sized and expensive to produce.

This invention has been designed to eliminate the above defects in the conventional liquid crystal device. An object of the invention is to provide a liquid crystal device which can response at high speed, be clear to display, and be small-sized and inexpensive to produce.

This invention is characterized in that the liquid crystal device comprises; a liquid crystal cell which provides a transparent substrate having interdigital electrodes and a transparent substrate having an opposite electrode, the substrates being disposed close to each other in relation of placing both the electrodes to be opposite to each other, and which charges liquid crystal between both the transparent substrates; and polarizers each having the polarization axis parallel to the orientation of liquid crystal caused by the electric field from the interdigital electrode at the liquid crystal cell.

These and other objects, features and advantages of the invention will be more apparent upon a reading of the following detailed specification and drawings.

Figure 2A:
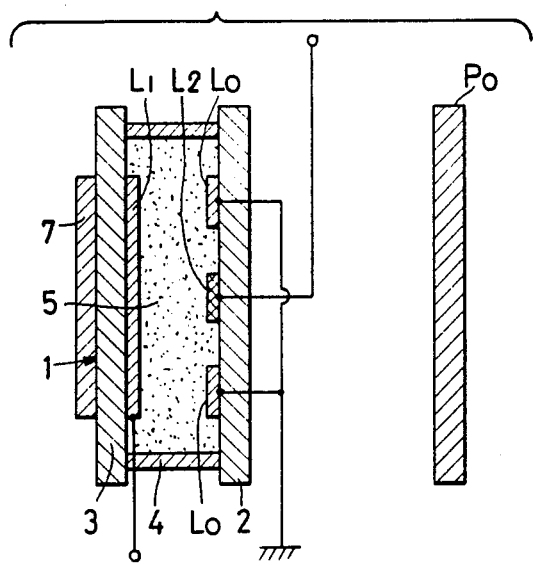
Figure 2B:
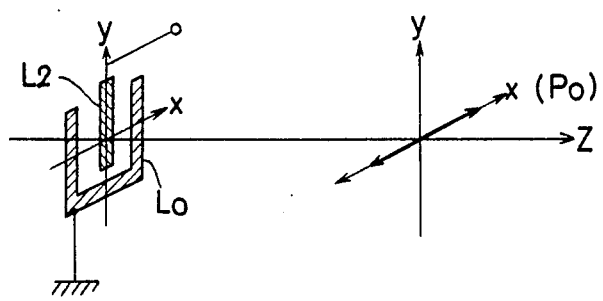
Figure 3:
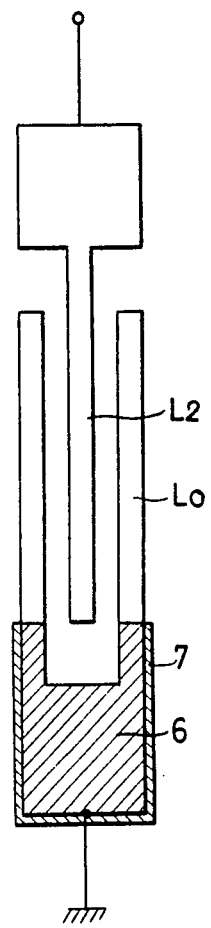

FIGS. 1-(A) and -(B) are views explanatory of a conventional liquid crystal device, FIGS. 2-(A) and -(B) are views explanatory of a liquid crystal device of the invention, and FIG. 3 is a plan view exemplary of an interdigital electrode.

FIGS. 2-(A) and -(B) show the fundamental construction of the liquid crystal device of the invention, in which reference numeral 1 designates a liquid crystal cell and Po designates a polarizer.

The liquid crystal cell comprises a transparent substrate 2 having at the inner surface interdigital electrodes $L_0$, $L_2$ and a transparent substrate 3 having at the inner surface an opposite electrode $L_1$, the substrate 2 and 3 being disposed close to each other at a given gap through spacers 4 and charges into the gap liquid crystal 5 exhibiting the positive dielectric anisotropy.

The transparent substrates 2 and 3 are subjected on the inner peripheries thereof to the molecular orientation treatment so that molecules of liquid crystal 5 are treated to orient in parallel or perpendicular with respect to the substrates.

The interdigital electrodes $L_0$ and $L_2$ and opposite electrode $L_1$ are formed of a transparent conductive material, such as tin oxide or indium oxide, and subjected to the conventional well-known thin film coating and etching process.

The interdigital electrodes, as shown in FIG. 3, comprise a recessed electrode $L_0$ and a projecting electrode $L_2$ inserted thereinto, the recessed electrode $L_0$ being grounded as a common electrode, the projecting electrode $L_2$ being connected to an exterior power source (not shown) and serving as the drive electrode. Upon applying drive voltage Vd between the interdigital electrodes $L_0$ and $L_2$, the liquid crystal 5 is forced to orient in parallel with respect to the substrates 2 and 3 at the liquid crystal cell 1.

The opposite electrode $L_1$, as the control electrode, is connected to the exterior power source (not shown). Upon applying control voltage Vc between the electrode $L_1$ and the common electrode $L_0$, the liquid crystal 5 is forced to orient perpendicularly to the substrates 2 and 3.

Incidentally, the number of teeth at the interdigital electrodes $L_0$ and $L_2$ is not defined to three as shown in FIG. 3, but desirably variable corresponding to the size of liquid crystal cell 1.

The polarizer Po is disposed behind the liquid crystal cell 1, in other words, at the light emitting side, so that its polarization axis extends perpendicularly to the directions of interdigital electrodes $L_0$ and $L_2$, in other words, in parallel to the orientation of liquid crystal 5 caused by the electric field generated by the interdigital electrodes.

Now, in the liquid crystal device of the invention, a miniature lamp having a luminous element of tungsten is disposed as the light source in front of the liquid crystal cell 1, in other words, at the light incident side, so that the molecules of liquid crystal 5, when drive voltage Vd is applied to between the interdigital electrodes $L_0$ and $L_2$ at the liquid crystal cell 1, will orient in parallel (in the direction of the axis x in FIG. 2-(B) to intensely absorb the transmission light and allow the light vertical (in the direction of the axis y) ony to pass through the liquid crystal cell 1. The light vertical (in the direction of the axis y) passes the liquid crystal cell 1 and is absorbed by the polarizer Po disposed close to the liquid cell 1 and having the polarization axis in the same direction as the parallel direction (in the direction of the axis x), thereby not passing the polarizer Po, thus forming the OFF condition for the transmission light.

In a case that the control voltage Vc is applied to between the opposite electrode $L_1$ and the grounding electrode $L_0$ at the crystal cell 1, the molecules of liquid crystal 5 are in vertical orientation (in the direction of the axis Z in FIG. 2-(B)) with respect to the substrates at the liquid crystal cell 1, so that the light is not absorbed by the liquid crystal 5, but passes it directly. The light having passed the liquid crystal 1 is absorbed, by the polarizer Po disposed close to the liquid crystal 1, of components except for those parallel to the polarization axis, but the component of the light parallel thereto passes the cell 1 directly, thereby forming the ON condition for the passing light. Hence, the ON or OFF condition of the transmission light is completed so as to function as the optoelectronic shutter or display device.

In addition, in this invention, even if the polarizer Po is disposed in front of the liquid crystal cell 1, i.e., at the light incident side, it is easily understandable for those in the art that the liquid crystal cell 1 functions as the same as the above.

Meanwhile, the drive method for the liquid crystal device of this invention is preferred to apply the drive voltage Vd always between the interdigital electrodes $L_0$ and $L_2$ at the liquid crystal 1 and to superpose or cut off the control voltage Vc applied to between the opposite electrode $L_1$ and the grounding electrode $L_0$. In other words, in the case that the control voltage Vc is applied to between the opposite electrode $L_1$ and the ground electrode $L_0$ as well as drive voltage Vd to between the electrodes $L_0$ and $L_2$, since the electric field is applied to the liquid crystal 5 more uniformly by the control voltage Vc than by the drive voltage Vd, the molecules of liquid crystal 5 are in the vertical orientation (in the direction of the axis Z in FIG. 2-(B)) with respect to the substrates at the liquid crystal cell 1, whereby the light passes the latter. The polarizer Po disposed close to the liquid crystal cell 1 absorbs the transmission light components perpendicular to the polarization axis of the polarizer Po, but allows the component parallel to the polarization axis to pass the cell 1 directly, thereby forming the ON condition for the transmission light.

In a case that the control voltage applied to between the opposite electrode $L_1$ and the grounding electrode $L_0$ is cut off and only the drive voltage Vd is applied to between the interdigital electrodes $L_0$ and $L_2$, the molecules of liquid crystal 5 are in parallel orientation (in the direction of the axis x) with respect to the substrates at the liquid crystal cell 1, and intensely absorb the parallel component (in the direction of the axis x) of the transmission light and allow only the vertical component (in the direction of the axis y) to pass the cell 1. The vertical light (in the direction of the axis y), which has passed the liquid crystal cell 1, is absorbed by the polarizer Po disposed close to the liquid crystal cell 1 and having the polarization axis parallel to the plane of cell 1 (in the direction of the x), thereby not passing the polarizer Po and being completely intercepted therewith to form the OFF condition for the transmission light. Thus, the ON or OFF condition of the transmission light is completed. Such driving method, in a case that a number of interdigital electrodes are juxtaposed, does not at all switch each interdigital electrode to be applied with drive voltage or cut off, thereby enabling all the interdigital electrodes to be connected in common. As a result, the electrodes for the liquid crystal cell are easily formed and the number of connection terminals for the power source need only be provided to a minimum.

Furthermore, at least one of the transparent substrates at the liquid crystal cell 1, as shown in FIG. 2-(A), is provided at the outer surface and a portion thereof corresponding to the bases 6 of interdigital electrodes $L_0$ and $L_2$ with a shade comprising a metallic vapor coating film, thereby effectively preventing a needless leak of the light caused by the recessed base of interdigital electrode $L_0$ and by the different orientation of liquid crystal at the base 6 of interdigital electrode. Hence, the complete OFF condition of the transmission light is defined and a portion to be put to practical use at the liquid crystal device is regulated, whereby the portion put to practical use can desirably and exactly be set to simplify manufacture of the liquid crystal device.

Alternatively, the shade 7 can also be formed at the inner surface of the transparent substrate 2 or 3 at the liquid crystal cell 1. In this instance, the shade 7 employs an insulating material, especially opaque insulating resin, for preventing the electrodes from mutually short-circuiting.

Next, explanation will be given on the operating effect of the invention in accordance with an embodiment of the invention to be hereinafter described.

In the following embodiment, a liquid crystal cell 1 and a polarizer Po are disposed as shown in FIG. 2 and interdigital electrodes are formed as shown in FIG. 3. The light source for the cell 1 uses a He-Ne laser ($k=6328\text{Å}$) and each liquid crystal cell is applied with drive voltage Vd and control voltage Vc so that the response speed (the rise time and fall time) and a contrast ratio as the liquid crystal device have been measured.

In addition, the rise time ($\tau$ write), fall time ($\tau$ erase) and contrast ratio for the response speed, are prescribed by the following equations respectively:

$$\tau \text{ write} = \tau \text{ delay} + \tau \text{ rise},$$

and $$\tau \text{ erase} = \tau \text{ decay},$$

where
- $\tau$ delay: the rise time for raising the intensity of the transmitted light from a minimum value to 10% of the maximum value of the intensity.
- $\tau$ rise: a time period for the intensity of the transmitted light rising from 10% to 90% of the maximum,
- $\tau$ decay: a time period for the intensity of the transmitted light which falls from 90% to 10% of the maximum value, and $$\text{Contrast ratio} = (T\max/T\min),$$

where
- T max: the maximum value of the intensity of the transmitted light, and
- T min: a minimum value of the same.

(EXAMPLE 1)

In this example, the liquid crystal cell and polarizer are formed of the following components or materials, and the drive voltage Vd of 35 V (r.m.s) is applied and the control voltage Vc of 35 V (r.m.s) is applied or cut off, at which time the response speed and contrast ratio have been measured.

Liquid crystal cell comprising:
liquid crystal in use: ZLI-1557 (manufactured by MELK Co.)
transparent substrate: glass substrate,
electrode material: indium oxide, and
a gap between the transparent substrate (thickness of liquid crystal layer): 12.5 μm, and
Polarizer using HN-38 (manufactured by Polaroide Co.).

(Result of Measurement)

Response speed:

Rise time ($\tau$ write) = 0.35 msec

Fall time ($\tau$ erase) = 0.36 msec

Contrast ratio:

$(T\max/T\min) = 20.5$

(EXAMPLE 2)

A liquid crystal cell, whose gap (thickness of the liquid crystal layer) between the substrates used in the embodiment 1 is 9.0 μm, is used and the drive voltage Vd of 35 V (r.m.s) is applied and the control voltage of 35 V (r.m.s) is applied or cut out, at which time the response speed and contrast ratio have been measured.

(Result of Measurement)

Response speed:

Rise time ($\tau$ write) = 0.33 msec

Fall time ($\tau$ decay) = 0.35 msec

Contrast ratio:

$(T\max/T\min) = 38$

(EXAMPLE 3)

A liquid crystal cell, whose gap (thickness of the liquid crystal layer) between the substrates used in the Example 1 is 6.0 μm, is used and the drive voltage Vd of 50 V (r.m.s) is applied and control voltage Vc of 35 V (r.m.s) is applied or cut off, at which time the response speed and contrast ratio have been measured.

(Result of Measurement)

Response speed:

Rise time ($\tau$ write) = 0.27 msec, and

Fall time ($\tau$ decay) = 0.30 msec, and

Contrast ratio:

$(T\max/T\min) = 73$

(COMPARATIVE EXAMPLE)

The liquid crystal cell and two polarizers in the embodiment 1 are disposed as shown in FIG. 1 and the control voltage of 35 V (r.m.s) and drive voltage Vd of 35 V (r.m.s) are alternately applied so that the response speed and contrast ratio have been measured.

(Result of Measurement)

Response speed:

Rise time ($\tau$ write) = 1.5 msec,

Fall time ($\tau$ decay) = 0.35 msec, and

Contrast ratio:

$(T\max/T\min) = 6.5.$

As seen from the measurement results of the aforesaid embodiments and comparative example, the liquid crystal cell and one polarizer are disposed so that the orientation of liquid crystal caused by the electric field from between the interdigital electrodes at the liquid crystal cell becomes parallel to the polarization axis of the polarizer, the drive voltage is always applied on the interdigital electrodes at the liquid crystal cell, and the control voltage to be applied to the opposite electrode is superposed on the drive voltage or cut off, thereby obtaining the liquid crystal device capable of responding at extremely high speed, especially being improved remarkably in the rise time, and having a high contrast ratio.

Also, in the liquid crystal device of the invention, the expensive polarizer to be used is only one, whereby the device is small-sized and inexpensive to produce.

Furthermore, the liquid crystal device of the invention, in a case that a number of interdigital electrodes are juxtaposed on one liquid crystal cell, does not at all allow each interdigital electrode to independently switch the drive voltage to be applied or cut off, thereby making it possible to connect all the interdigital electrodes in common. Hence, the liquid crystal cell is easy to form the electrodes and saving the connection terminals to the power source in number to a minimum.

Accordingly, in a case that the liquid crystal device of the invention is used as optoelectronic shutters or display devices, they can respond at extremely high speed, are superior in clearness for display, and are small-sized and inexpensive to produce.

What is claimed is:

1. A liquid crystal device comprising:
   a liquid crystal cell including a first transparent substrate having interdigital electrodes, a second transparent substrate having an opposite electrode, the interdigital electrodes and the opposite electrodes being disposed close to each other so that said interdigital electrodes and opposite electrode are opposite to each other, and liquid crystal between both said transparent substrates; and
   a polarizer having the polarization axis parallel to the orientation direction of said liquid crystal caused by the electric field produced between said interdigital electrodes,
   wherein at least one of said first transparent substrate having the interdigital electrodes and second transparent substrate having the opposite electrode, is provided at a portion corresponding to the bases of said interdigital electrode with a shade member.

2. A liquid crystal device according to claim 1, wherein said shade member is provided at the outer surface of said one transparent substrate.

3. A liquid crystal device according to claim 2, wherein said shade member is formed of a metallic vaporcoating film.

4. A liquid crystal device according to claim 1, wherein said shade member is provided at the inner surface of said one transparent substrate.

5. A liquid crystal device according to claim 4, wherein said shade member is formed of insulating resin.

6. A liquid crystal device according to claim 1, wherein said liquid crystal device is a display device.

7. A liquid crystal device according to claim 1, wherein said liquid crystal device is an optoelectronic shutter.

8. A driving method for a liquid crystal device according to claim 1, wherein said opposite electrode is applied with voltage while said interdigital electrodes are being applied with voltage, thereby forming the transmission condition of the light, and only said voltage applied to said opposite electrode is cut off, thereby forming a cut-off condition of the transmission light.

* * * * *